US010009765B2

(12) United States Patent
Jung et al.

(10) Patent No.: US 10,009,765 B2
(45) Date of Patent: Jun. 26, 2018

(54) ELECTRONIC DEVICE AND METHOD FOR DISCOVERING NETWORK IN ELECTRONIC DEVICE

(71) Applicant: Samsung Electronics Co., Ltd., Gyeonggi-do (KR)

(72) Inventors: Bu-Seop Jung, Gyeonggi-do (KR); Jun-Ho Lee, Gyeonggi-do (KR); Young-Kwan Chung, Gyeonggi-do (KR); Yong-Hae Choi, Gyeonggi-do (KR); Jong-Mu Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 139 days.

(21) Appl. No.: 14/806,232

(22) Filed: Jul. 22, 2015

(65) Prior Publication Data
US 2016/0029215 A1 Jan. 28, 2016

(30) Foreign Application Priority Data

Jul. 23, 2014 (KR) .................. 10-2014-0093349

(51) Int. Cl.
| H04W 12/06 | (2009.01) |
| H04W 12/04 | (2009.01) |
| H04W 40/24 | (2009.01) |
| H04L 29/06 | (2006.01) |
| H04W 12/02 | (2009.01) |
| H04W 84/12 | (2009.01) |
| H04W 48/14 | (2009.01) |
| H04W 48/16 | (2009.01) |

(52) U.S. Cl.
CPC ........... *H04W 12/06* (2013.01); *H04L 63/068* (2013.01); *H04W 12/02* (2013.01); *H04W 12/04* (2013.01); *H04W 48/14* (2013.01); *H04W 48/16* (2013.01); *H04W 84/12* (2013.01)

(58) Field of Classification Search
CPC ..... H04W 12/06; H04W 12/02; H04W 48/16; H04W 48/14; H04W 12/04; H04W 84/12; H04L 63/068
See application file for complete search history.

(56) References Cited

U.S. PATENT DOCUMENTS

| 2009/0177887 | A1* | 7/2009 | Li | H04W 12/10 713/170 |
| 2010/0208896 | A1* | 8/2010 | Goto | H04L 63/065 380/279 |
| 2010/0313020 | A1* | 12/2010 | Montemurro | H04L 63/0892 713/168 |
| 2012/0076118 | A1* | 3/2012 | Montemurro | H04W 48/16 370/338 |

(Continued)

Primary Examiner — Meng Li
(74) Attorney, Agent, or Firm — The Farrell Law Firm, P.C.

(57) ABSTRACT

An electronic device includes a memory configured to store identification information of an information server that is matched with an encryption key; and a controller configured to send, before the electronic device is connected with an external device, a request for network information of the external device to the external device in a network discovery frame encrypted using the encryption key matched with the identification information of the information server, and to receive the network information of the external device from the external device in the encrypted network discovery frame.

18 Claims, 12 Drawing Sheets

(56) References Cited

U.S. PATENT DOCUMENTS

| | | |
|---|---|---|
| 2013/0007850 A1 | 1/2013 | Lambert |
| 2013/0057591 A1* | 3/2013 | Sugiyama ............. H04W 48/20 345/671 |
| 2013/0097424 A1 | 4/2013 | Simon et al. |
| 2013/0121325 A1* | 5/2013 | McCann ............... H04W 48/12 370/338 |
| 2013/0183966 A1 | 7/2013 | Chan et al. |
| 2013/0227022 A1 | 8/2013 | Trivedi et al. |
| 2014/0105398 A1* | 4/2014 | Gao .................... H04M 1/7253 380/270 |
| 2014/0115333 A1* | 4/2014 | King .................... H04W 12/04 713/168 |
| 2015/0098459 A1* | 4/2015 | Lee ....................... H04W 48/14 370/338 |
| 2016/0156463 A1* | 6/2016 | Suzuki .................. H04L 9/0861 713/171 |

* cited by examiner

ANQP information ID definitions

| Information name | Information ID |
|---|---|
| Reserved | 0 - 255 |
| ANQP Query list | 256 |
| ANQP Capability list | 257 |
| Venue Name information | 258 |
| Emergency Call Number information | 259 |
| Network Authentication Type information | 260 |
| Roaming Consortium list | 261 |
| IP Address Type Availability information | 262 |
| NAI Realm list | 263 |
| 3GPP Cellular Network information | 264 |
| AP Geospatial Location | 265 |
| AP Civic Location | 266 |
| AP Location Public Identifier URI | 267 |
| Domain Name list | 268 |
| Emergency Alert Identifier URI | 269 |
| Emergency NAI | 271 |
| Reserved | 272 - 56796 |
| ANQP vendor-specific list | 56797 |
| Reserved | 56798 - 65535 |

FIG.1
(PRIOR ART)

ELECTRONIC DEVICE AND METHOD FOR DISCOVERING NETWORK IN ELECTRONIC DEVICE

PRIORITY

This application claims priority under 35 U.S.C. § 119(a) to a Korean Patent Application filed in the Korean Intellectual Property Office on Jul. 23, 2014 and assigned Serial No. 10-2014-0093349, the entire content of which is incorporated herein by reference.

BACKGROUND

1. Field of the Invention

The present invention generally relates to an electronic device and a method for discovering a network in the electronic device, and more particularly, to an electronic device capable of securely requesting and receiving network information of an external device in a network discovery operation that is performed before the electronic device is connected to the external device, and a method for discovering a network in the electronic device.

2. Description of the Related Art 802.11u is the standard established to discover external network information of an Access Point (AP).

In 802.11u, an electronic device allows network discovery with an external network regardless of its connection to an AP, so network discovery is possible in the electronic device even in the pre-association state.

In an Access Network Query Protocol (ANQP) which is the typical protocol of 802.11u, an electronic device may perform network discovery with an external information server using Generic Advertisement Service (GAS) Initial Request/Response frames that are specified as action frames in 802.11u, and the network discovery operation may be performed regardless of the connection to an AP.

Basically, if an electronic device queries an AP about ANQP information using a GAS Initial Request frame, the AP may query an information server (or an ANQP server) about the ANQP information, and send a response of the information server back to the electronic device in a GAS Initial Response frame. If an ANQP query value is too large or a response of the information server is delayed, the AP may first send a GAS Initial Response frame to the electronic device to inform the delay. In this case, the electronic device may obtain necessary ANQP information through the exchange of GAS Comeback Request/Response frames after it is informed of the comeback delay.

FIG. 1 illustrates network information that an electronic device can receive through network discovery. As illustrated in FIG. 1, an electronic device may receive, as network information, a variety of ANQP information which includes elements defined in the ANQP protocol.

By utilizing an ANQP vendor-specific list field, it is possible to customize define information about elements other than the elements defined in the standard. Recently, attempts have been made to use not only the network information defined in the standard, but also a variety of information customized defined using this feature, and this information may include the information that should not be exposed due to its security.

As described above, the network discovery based on 802.11u may be performed regardless of a Wireless Fidelity (Wi-Fi) connection. In other words, an electronic device may receive network information through a network discovery operation with an external network or a separate information server in an unauthenticated state of the pre-association state. 802.11u communication that is performed in the unauthenticated state has a weakness in terms of the security because it does not have the separate L2 layer security. Basically, the GAS Initial Request/Response frames for 802.11u communication are based on the unauthenticated state, so details of the frames may be easily exposed. Therefore, the network information that should not be exposed due to its security, among a variety of network information included in the frames, may also be easily exposed.

For example, upon receiving a GAS Initial Request frame for requesting network information from an electronic device while monitoring it in a passive way in a specific channel where an AP is located, an attacker may insert a Media Access Control (MAC) address of an AP (which is a target to which the electronic device will send a GAS Response frame) into a GAS Initial Response frame as a source address, insert a failure code therein by compulsion, and send the resulting frame to the electronic device. Thereafter, the electronic device, which has received the GAS Initial Response frame from the attacker, may drop a GAS Initial Response frame received from an AP even though the GAS Initial Response frame is actually received from the AP, and determine that the reception of the network information is failed. Alternatively, the attacker may forge a payload of a GAS Initial Response frame and send the forged frame to the electronic device, so the electronic device may receive incorrect network information.

In general, an AP has a predetermined amount of buffer for processing the GAS Initial Request frame received from the electronic device. In this case, if the attacker consecutively sends multiple GAS Initial Request frames including different source MAC addresses to the AP for a short period of time, the buffer assigned to the AP may be saturated. If the buffer of the AP is saturated, the AP may not process the GAS Initial Request frame received from the electronic device, causing a reduction in the transmission capacity for the GAS Initial Response frame that the AP sends to the electronic device.

SUMMARY

The present invention has been made to address at least the above-mentioned problems and/or disadvantages and to provide at least the advantages described below. Accordingly, an aspect of the present invention is to provide an electronic device capable of securely requesting and receiving network information of an external device in a network discovery operation that is performed before the electronic device is connected to the external device, and a method for discovering a network in the electronic device.

In accordance with an aspect of the present invention, an electronic device is provided, which includes a memory configured to store identification information of an information server that is matched with an encryption key; and a controller configured to send, before the electronic device is connected with an external device, a request for network information of the external device to the external device in a network discovery frame encrypted using the encryption key matched with the identification information of the information server, and to receive the network information of the external device from the external device in the encrypted network discovery frame.

In accordance with another aspect of the present invention, a method for discovering a network in an electronic device is provided. The method includes encrypting a network discovery frame using an encryption key, before the electronic device is connected with an external device; sending a request for network information of the external device to the external device in the encrypted network discovery frame; and receiving the network information of the external device from the external device in the encrypted network discovery frame.

BRIEF DESCRIPTION OF THE DRAWINGS

The above and other aspects, features and advantages of certain embodiments of the present invention will be more apparent from the following description, taken in conjunction with the accompanying drawings, in which:

FIG. 1 illustrates network information that an electronic device can receive through network discovery;

Throughout the drawings, like reference numerals will be understood to refer to like parts, components, and structures.

DETAILED DESCRIPTION OF EMBODIMENTS OF THE PRESENT INVENTION

Figure 2:
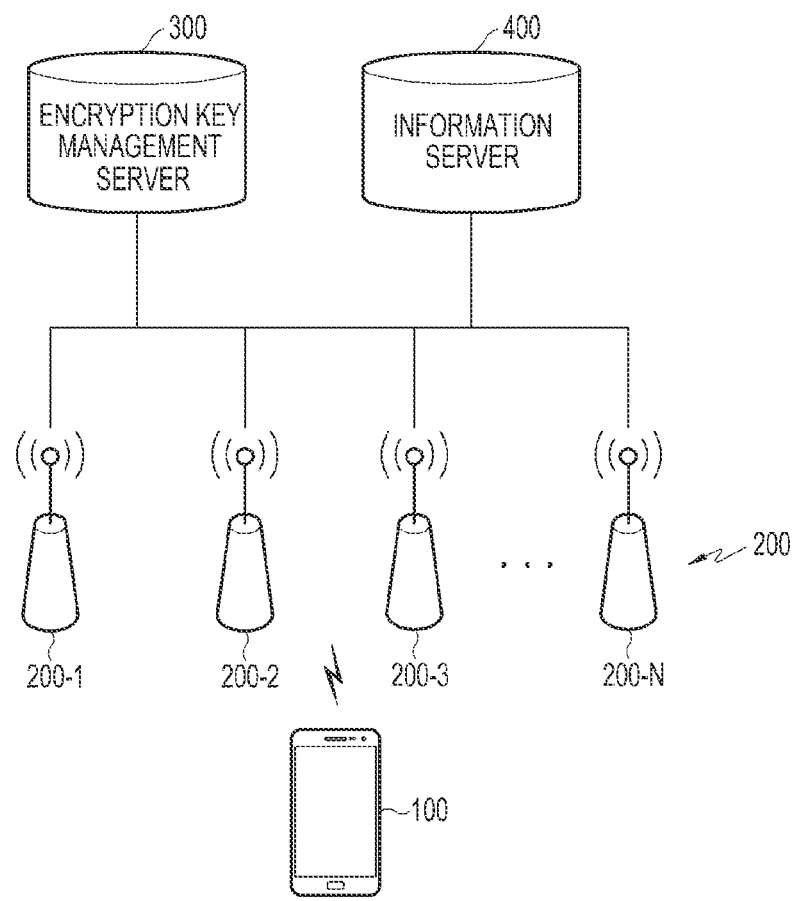
FIG. 2 illustrates a configuration of a Wi-Fi Hotspot network system according to an embodiment of the present invention.

The following description with reference to the accompanying drawings is provided to assist in a comprehensive understanding of various embodiments of the invention as defined by the claims and their equivalents. It includes various specific details to assist in that understanding but these are to be regarded merely as examples. Accordingly, those of ordinary skilled in the art will recognize that various changes and modifications of the embodiments described herein can be made without departing from the scope and spirit of the present invention. In addition, descriptions of well-known functions and constructions may be omitted for clarity and conciseness.

The terms and words used in the following description and claims are not limited to their meanings in a dictionary, but, are merely used to enable a clear and consistent understanding of the present invention. Accordingly, it should be apparent to those skilled in the art that the following description of the embodiments of the present invention is provided for illustration purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement errors, measurement accuracy limitations and other factors known to those of skill in the art, may occur in amounts that do not preclude the effect that the characteristic was intended to provide.

An electronic device according to various embodiments of the present invention may be a device with the communication capability. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MP3 player, a mobile medical device, a camera, and a wearable device (e.g., a Head Mounted Device (HMD) (such as electronic eyeglasses), electronic cloth (or e-cloth), electronic bracelet, electronic necklace (or e-necklace), electronic application accessory (or appcessory), electronic tattoo and a smart watch).

According to some embodiments of the present invention, the electronic device may be a smart home appliance with the communication capability. The smart home appliance (e.g., the electronic device) may include at least one of a Television (TV), a Digital Video Disk (DVD) player, an audio player, a refrigerator, an air conditioner, a cleaner, an oven, a microwave oven, a washing machine, an air cleaner, a set-top box, a TV box (e.g., Samsung HomeSync™, Apple TV™, or Goggle TV™), a game console, an electronic dictionary, an electronic key, a camcorder, and an electronic photo album.

According to some embodiments of the present invention, the electronic device may include at least one of a medical device (e.g., Magnetic Resonance Angiography (MRA), Magnetic Resonance Imaging (MRI), Computed Tomography (CT), medical camcorder, ultrasound device, etc.), a navigation device, a Global Positioning System (GPS) receiver, an Event Data Recorder (EDR), a Flight Data Recorder (FDR), an automotive infotainment device, a marine electronic equipment (e.g., marine navigation device, gyro compass, etc.), an avionics, a security device, a car head unit, an industrial or household robot, an Automatic Teller's Machine (ATM) for banks, and a Point Of Sale (POS) for shops.

According to some embodiments of the present invention, the electronic device may include at least one of a part of the furniture or building/structure with the communication capability, an electronic board, an electronic signature receiving device, a projector, and various measurement devices (e.g., water meter, electricity meter, gas meter, radio wave measurement device, etc.). The electronic device according to various embodiments of the present invention may be any one or a combination of the above-stated various devices. The electronic device according to various embodiments of the present invention may be a flexible device. It will be apparent to those of ordinary skill in the art that the electronic device according to various embodiments of the present invention is not limited to the above-mentioned devices.

The term 'user' used in various embodiments of the present invention may refer to the person who uses the electronic device, or the device (e.g., intelligent electronic device) that uses the electronic device.

In various embodiments of the present invention, short-range communication may include a Wi-Fi communication network capable of supporting Hotspot 2.0 in which network switching is automatically performed from a mobile communication network to the Wi-Fi communication network. Besides, in various embodiments of the present invention, an external device may be described as an AP.

Although an information exchange operation (ANQP query/response) with an information server providing network information of an AP will be described by way of an example in various embodiments of the present invention, an information exchange operation of an advertising server providing advertising service data may also performed in the same way as that of an information exchange operation (advertisement query/response) with an information server.

In various embodiments of the present invention, network discovery frames may include GAS Initial Request/Response frames for 802.11u communication as frames for transmitting and receiving information between an electronic device and an AP, between an AP and an encryption key management server, or between an AP and an information server.

FIG. 2 illustrates a configuration of a Wi-Fi Hotspot network system according to an embodiment of the present invention.

Referring to FIG. 2, the Wi-Fi Hotspot 2.0 network system includes an electronic device 100, APs 200, an encryption key management server 300, and an information server 400. Although a plurality of APs 200-1 to 200-N are illustrated in FIG. 2, the APs 200 may include only one AP.

The electronic device 100 discovers and displays at least one of the APs 200 supporting Hotspot 2.0 through a scanning operation for a Wi-Fi connection, and detects identification (ID) information of an information server and information indicating support of encrypted network discovery from a beacon frame or a probe response frame received from an AP selected from the at least one of the APs 200. The electronic device 100 encrypts a network discovery frame using an encryption key corresponding to the identification (ID) information of an information server, which is detected from the beacon frame or probe response frame, sends a request for network information of an AP to an information server of the selected AP in the encrypted network discovery frame, and receives the network information of an AP from the information server of the selected AP in the encrypted network discovery frame. The operation of the electronic device 100 will be described in detail with reference to FIG. 3.

The APs 200 broadcast a beacon frame including identification (ID) information of an information server and information indicating support of encrypted network discovery. Upon receiving a probe request frame from the electronic device 100, the APs 200 send a probe response frame including identification (ID) information of an information server and information indicating support of encrypted network discovery, to the electronic device 100.

The APs 200 generate and provide an encryption key using the network discovery frame in response to a request for an encryption key by the electronic device 100, and send the generated encryption key and a MAC address of the electronic device 100 to the encryption key management server 300.

The APs 200 generate and provide a temporary encryption key using the network discovery frame in response to a request for an encryption key by the electronic device 100. If a first random key is transmitted from the electronic device 100 in a network discovery frame encrypted with the temporary encryption key, the APs 200 generate an encryption key using the random key, and send the generated encryption key to the electronic device 100 in the network discovery frame encrypted with the temporary encryption key. The APs 200 generate an expiration time of the encryption key when generating the encryption key, and send the expiration time to the electronic device 100 together with the encryption key.

After sending the probe response frame to the electronic device 100, the APs 200 send a second random key generated by the AP 200 to the electronic device 100 in the network discovery frame. Upon receiving the first random key generated by the electronic device 100 from the electronic device 100 in the network discovery frame, the APs 200 generate an encryption key by applying the first random key and the second random key to a predefined key generation algorithm.

The APs 200 send the encryption key and the MAC address of the electronic device 100 to the encryption key management server 300, and the APs 200 may send the encryption key and the MAC address of an electronic device together with an expiration time of the encryption key. Upon receiving a request for network information from the electronic device 100 in an encrypted network discovery frame, the APs 200 send a request for an encryption key and a MAC address of an electronic device to the encryption key management server 300. Upon receiving the encryption key from the encryption key management server 300, the APs 200 decrypts the encrypted network discovery frame received from the electronic device 100, using the encryption key.

If the decryption is successful, the APs 200 send a request for the network information of an AP to the information server 400, determining that the encryption key is valid. The APs 200 send the network information of an AP, which is received from the information server 400, to the electronic device 100 in a network discovery frame that is encrypted using the encryption key.

If the decryption has failed, the APs 200 send information indicating invalidity of the encryption key of an electronic device to the electronic device 100 in a network discovery frame, determining that the encryption key is invalid. Upon receiving information indicating expiration of the encryption key from the encryption key management server 300, the APs 200 send information indicating invalidity of the encryption key of an electronic device to the electronic device 100 in a network discovery frame.

Upon receiving a MAC address of an electronic device and an encryption key from the APs 200, the encryption key management server 300 matches the MAC address of an electronic device with the encryption key and stores the matching result. Upon receiving an expiration time of the encryption key from the APs 200 together with the MAC address of an electronic device and the encryption key, the encryption key management server 300 manages the expiration time of the encryption key. The encryption key management server 300 deletes the encryption key of which the expiration time has expired, and manages the encryption key as an expired encryption key.

Upon receiving a request for an encryption key and a MAC address of an electronic device from the APs 200, the encryption key management server 300 sends the encryption key that is matched with the MAC address of an electronic device and stored, to the APs 200. When a request for an encryption key and a MAC address of an electronic device is received from the APs 200, the encryption key management server 300 manages the encryption key that is matched with the MAC address of an electronic device and stored, as an expired encryption key, and sends information indicating the expiration of the encryption key to the APs 200. The encryption key management server 300 may be incorporated into the information server 400, or into a Wireless Local Area Network (WLAN) controller for controlling the at least one of the APs 200.

Upon receiving a request for the network information of an AP from the APs 200, the information server 400 sends the requested network information of an AP to the APs 200.

Figure 3:
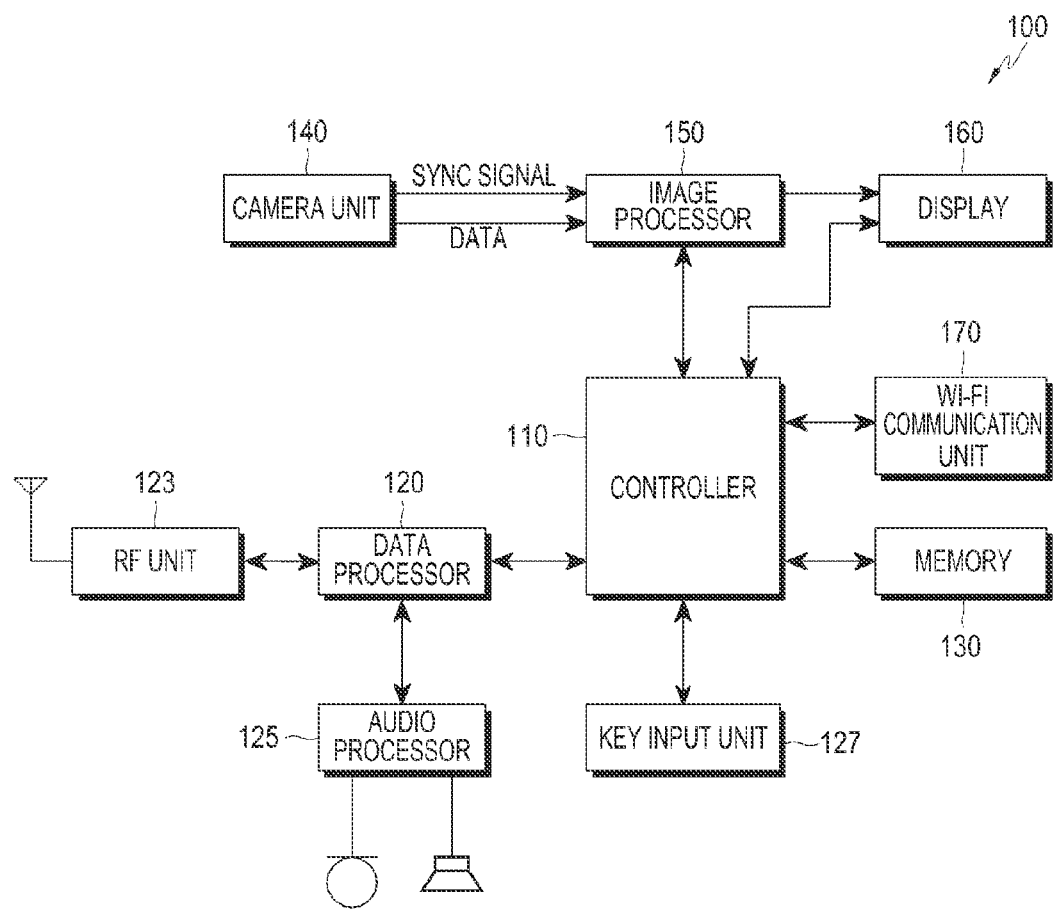
FIG. 3 illustrates a configuration of an electronic device according to an embodiment of the present invention.

FIG. 3 illustrates a configuration of an electronic device 100 according to an embodiment of the present invention.

Referring to FIG. 3, the electronic device 110 includes a controller 110, a data processor 120, a Radio Frequency (RF) unit 123, an audio processor 125, a key input unit 127, a memory 130, a camera unit 140, an image processor 150, a display 160, and a Wi-Fi communication unit 170.

The RF unit 123 performs a wireless communication function of the electronic device. The RF unit 123 may include an RF transmitter for up-converting a frequency of transmission signals and amplifying the up-converted transmission signals, and an RF receiver for low-noise amplifying received signals and down-converting a frequency of the amplified received signals.

The data processor 120 includes a transmitter for encoding and modulating the transmission signals, and a receiver for demodulating and decoding the received signals. In other words, the data processor 120 may include a modulator-demodulator (modem), and a coder-decoder (codec). The codec may include a data codec for processing data signals such as packet data, and an audio codec for processing audio signals such as voice.

The audio processor 125 plays received audio signals output from the audio codec in the data processor 120, and/or provides transmission audio signals generated by a microphone (MIC) to the audio codec in the data processor 120.

A key input unit 127 includes alphanumeric keys for inputting numeric and character information and function keys for setting various functions.

A memory 130 includes a program memory and a data memory. The program memory stores programs for controlling the general operation of the electronic device, and controls programs for sending a request for network information of an AP in an encrypted network discovery frame and receiving network information of an AP in the encrypted network discovery frame before a connection to an AP according to various embodiments of the present invention. The data memory temporarily stores the data generated during an execution of the programs.

In accordance with various embodiments of the present invention, the memory 130 stores identification (ID) information of at least one information server and at least one encryption key that is matched to the identification (ID) information of the at least one information server and stored.

The controller 110 controls the overall operations of the electronic device.

In accordance with various embodiments of the present invention, if at least one of the APs 200 supporting Hotspot 2.0 is discovered through a scanning operation for a Wi-Fi connection and information indicating support of encrypted network discovery is detected from a beacon frame or a probe response frame received from an AP selected from the at least one of the APs 200, then the controller 110 detects identification (ID) information of an information server from the beacon frame or probe response frame. If the identification (ID) information of an information server, which is detected from the beacon frame or probe response frame, is stored in the memory 130, the controller 110 detects an encryption key corresponding to the identification (ID) information of an information server from the memory 130, and encrypts a network discovery frame including information for requesting network information of the selected AP, using the encryption key. The controller 110 sends a request for the network information of an AP to the APs 200 in the encrypted network discovery frame, and receives the network information of an AP from the APs 200. If the identification (ID) information of an information server, which is detected from the beacon frame or probe response frame, is not stored in the memory 130, the controller 110 sends a request for an encryption key to the AP 200, receives an encryption key from the APs 200, matches the received encryption key with the identification (ID) information of an information server, which is detected from the beacon frame or probe response frame, and stores the matching result in the memory 130. If the identification (ID) information of an information server, which is detected from the beacon frame or probe response frame, is not stored in the memory 130, the controller 110 sends a request for an encryption key to the APs 200, receives a temporary encryption key from the APs 200, encrypts a network discovery frame including a random key with the temporary encryption key, and sends the encryption result to the APs 200. Upon receiving an encryption key from the APs 200 in a network discovery frame encrypted with the temporary encryption key, the controller 110 matches the received encryption key with the identification (ID) information of an information server, which is detected from the beacon frame or probe response frame, and stores the matching result in the memory 130. If the identification (ID) information of an information server, which is detected from the beacon frame or probe response frame, is not stored in the memory 130, the controller 110 sends a first random key generated in the electronic device to the APs 200, and upon receiving a second random key from the APs 200, the controller 110 generates an encryption key by applying the first random key and the second random key to a predefined key generation algorithm. After generating the encryption key, the controller 110 matches the generated encryption key with the identification (ID) information of an information server, which is detected from the beacon frame or probe response frame, and stores the matching result in the memory 130.

Upon receiving information indicating invalidity of the encryption key of the electronic device from the APs 200 in a network discovery frame after sending a request for network information of an AP to the APs 200 in the encrypted network discovery frame, the controller 110 sends a request for an encryption key to the APs 200 and receives the encryption key from the APs 200, or generates an encryption key using the first random key of the electronic device and the second random key provided from the AP 200.

The camera unit 140 includes a camera sensor for capturing an image and converting a captured optical image signal into an electrical image signal, and a signal processor for converting an analog image signal from the camera sensor into digital data. The camera sensor may be configured to be a Charge Coupled Device (CCD) or Complementary Metal-Oxide Semiconductor (CMOS) sensor, and the signal processor may be implemented as a Digital Signal Processor (DSP). The camera sensor and the signal processor may be implemented integrally or separately.

The image processor 150 performs Image Signal Processing (ISP) for displaying the image signal output from the camera unit 140 on a display 160, and the ISP may include gamma correction, interpolation, spatial variation, image effects, image scaling, Automatic White Balance (AWB), Automatic Exposure (AE), Automatic Focus (AF), and the like. The image processor 150 processes the image signal output from the camera unit 140 on a frame-by-frame basis, and outputs the frame image data according to the features and size of the display 160. The image processor 150, which may include a video codec, compresses the frame image data displayed on the display 160 and/or restores (or decompresses) the compressed frame image data to the original frame image data using a preset coding scheme. The video codec may be a Joint Photographic Experts Group (JPEG) codec, a Moving Picture Experts Group 4 (MPEG4) codec, a Wavelet codec, or the like. The image processor 150 may be configured to have an On Screen Display (OSD) function, and may output OSD data depending on the size of the screen on which the OSD data is displayed, under control of the controller 110.

The display 160 displays, on its screen, the image signal output from the image processor 150 and the user data output from the controller 110. The display 160 may use a Liquid Crystal Device (LCD) as its display panel. In this case, the display 160 may include an LCD controller, a memory capable of storing image data, and an LCD panel. If the LCD panel is implemented in a touch screen way, the LCD panel may serve as an input unit. In this case, the display 160 may display virtual keys corresponding to the physical keys mounted on the key input unit 127. If the display 160 is used as a touch screen unit when the display 160 is implemented in a touch screen way, the touch screen unit may have a Touch Screen Panel (TSP) including multiple sensor panels. The sensor panels may include a capacitive sensor panel capable of recognizing coarse touches such as finger touches, and an electromagnetic induction sensor panel capable of detecting fine touches such as pen touches. In accordance with various embodiments of the present invention, if at least one of the APs 200 supporting Hotspot 2.0 is discovered through a scanning operation for a Wi-Fi connection, the display 160 displays the discovered at least one of the APs 200. If an AP is selected from the at least one of the APs 200, the display 160 displays some of network information of the AP, which is received from the information server 400 of the AP through the AP.

The Wi-Fi communication unit 170, which is a short-range wireless communication unit, may be connected to an AP supporting Hotspot 2.0.

A network discovery operation in the electronic device will be described in detail with reference to FIGS. 4 to 9.

Figure 4:
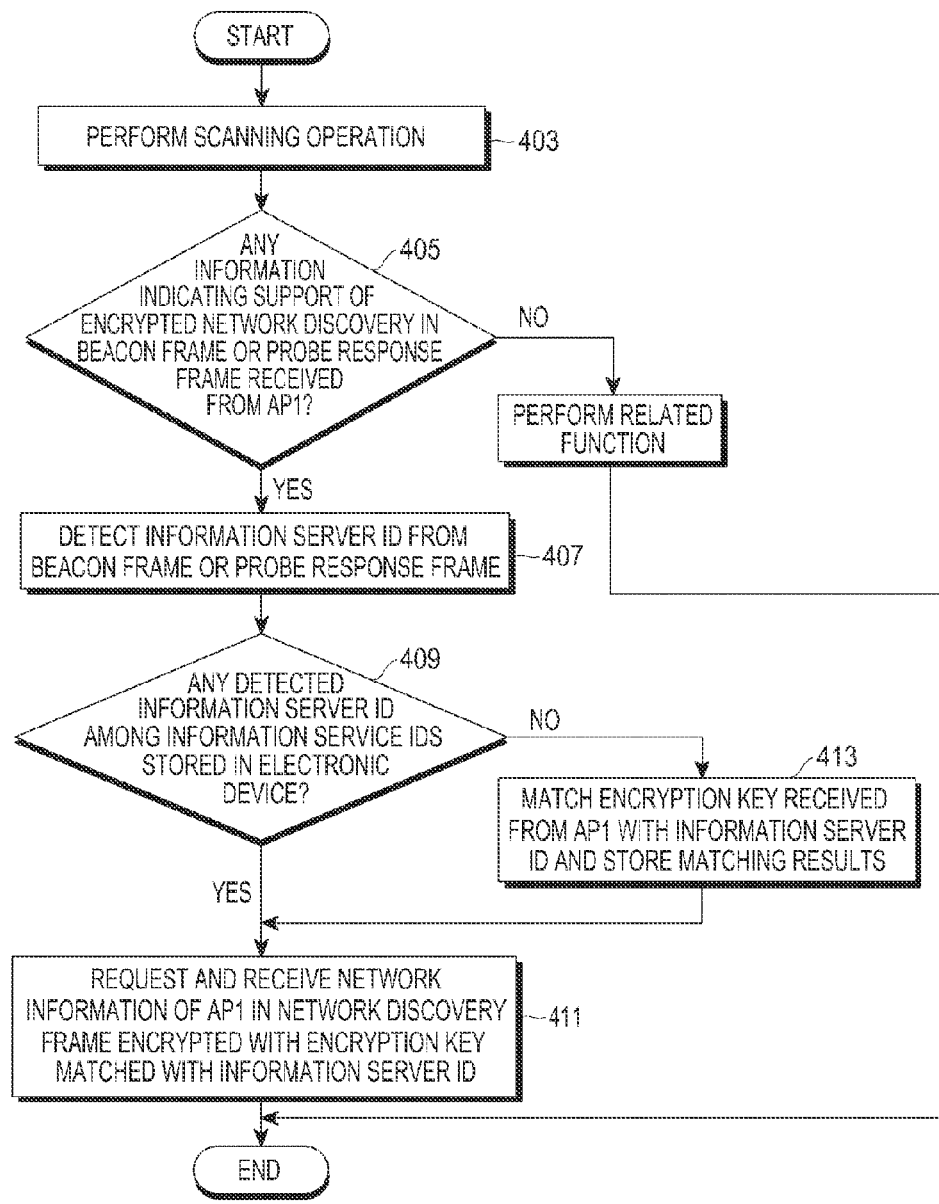
FIG. 4 is a flowchart illustrating a network discovery operation in an electronic device according to an embodiment of the present invention.

FIG. 4 is a flowchart illustrating a network discovery operation in an electronic device according to an embodiment of the present invention. Here, the embodiment of the present invention illustrated in FIG. 4 will be described in detail below with reference to FIGS. 1, 2, and 3.

Referring to FIG. 4, in step 403, the controller 110 performs a scanning operation of discovering a nearby AP, for a Wi-Fi connection. If at least one of the APs 200 is discovered through the scanning operation, the controller 110 may display the discovered at least one of the APs 200 on the display 160. If a first AP 200-1 is selected from among the at least one of the APs 200, the controller 110 determines in step 405 whether information indicating support of encrypted network discovery is present in a beacon frame or a probe response frame received from the first AP 200-1.

If it is determined in step 405 that the information indicating support of encrypted network discovery is not present in the beacon frame or probe response frame received from the first AP 200-1, the controller 110 sends a request for network information of the first AP 200-1 to the first AP 200-1 in a non-encrypted network discovery frame.

If it is determined in step 405 that the information indicating support of encrypted network discovery is present in the beacon frame or probe response frame received from the first AP 200-1, the controller 110 determines that the first AP 200-1 can perform a function capable of sending and receiving network information of the first AP 200-1 in an encrypted network discovery frame. In step 407, the controller 110 detects the identification (ID) information of an information server from the beacon frame or probe response frame. In step 409, the controller 110 determines whether the detected identification (ID) information of an information server is present in the memory 130. If it is determined in step 409 that the detected identification (ID) information of an information server is present in the memory 130, the controller 110 detects from the memory 130 an encryption key that is matched with the detected identification (ID) information of an information server and stored in the memory 130 (that is, the encryption key has been already stored in the memory 130 and then is detected), stores information for requesting network information of the first AP 200-1 in a network discovery frame, and encrypts the network discovery frame using the encryption key, in step 411. The controller 110 then sends a request for network information of the first AP 200-1 to the first AP 200-1 in the encrypted network discovery frame, and receives the network information of the first AP 200-1 from the first AP 200-1 in the encrypted network discovery frame, in step 411.

However, if it is determined in step 409 that the detected identification (ID) information of an information server is not present in the memory 130, the controller 110 matches an encryption key that is received from the first AP 200-1 on request (that is, the encryption key is received from the first AP 200-1 upon a request for the encryption key is sent to the first AP 200-1), with the identification (ID) information of an information server that is detected from the beacon frame or the probe response frame received from the first AP 200-1, and stores the matching result in the memory 130, in step 413. The controller 110 then proceeds to step 411. The network discovery operation in FIG. 4 will be described in detail with reference to FIGS. 5 to 7.

Figure 5A:
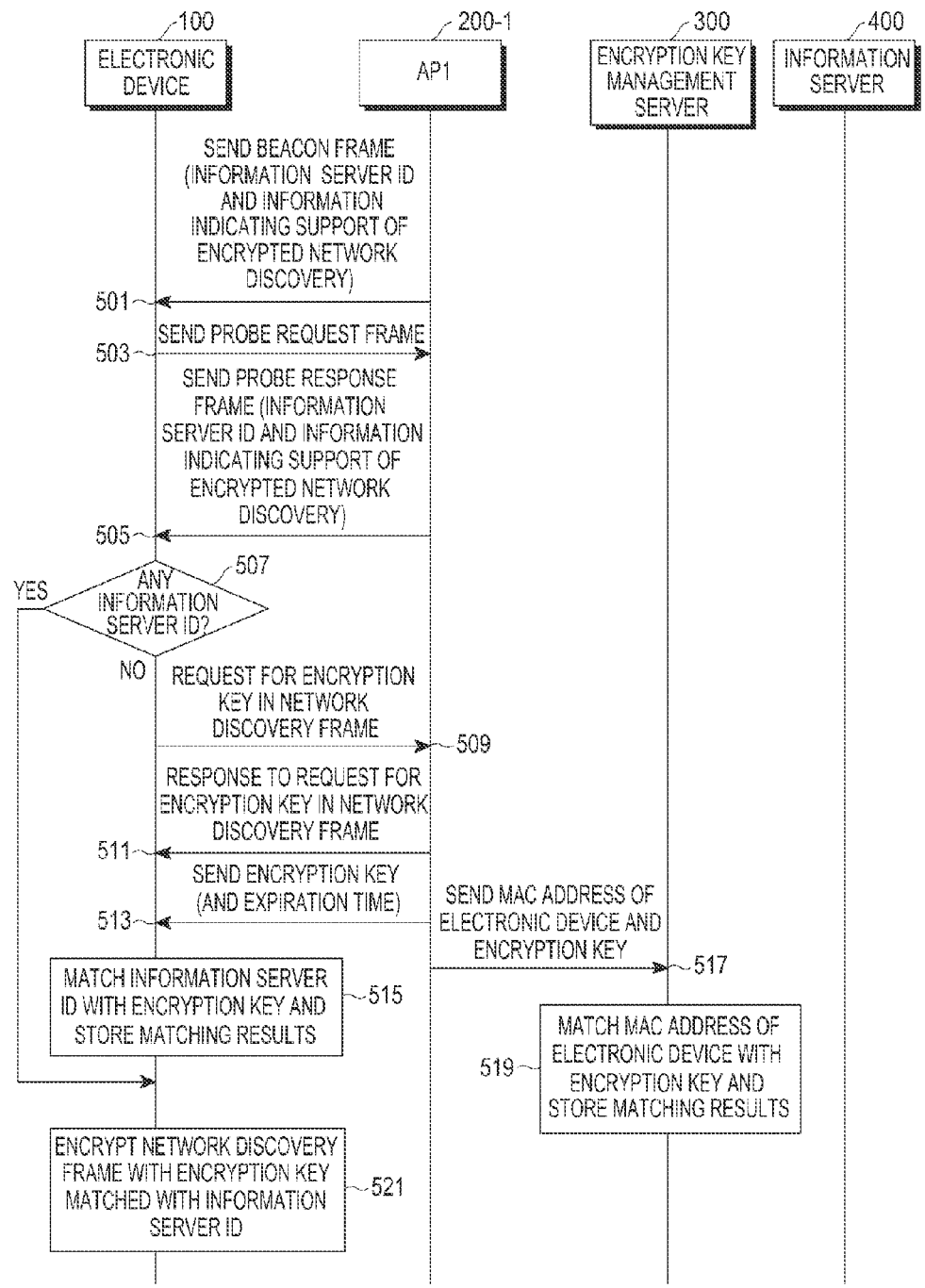
FIGS. 5A and 5B are flow diagrams illustrating a network discovery operation in an electronic device according to a first embodiment of the present invention.
Figure 5B:
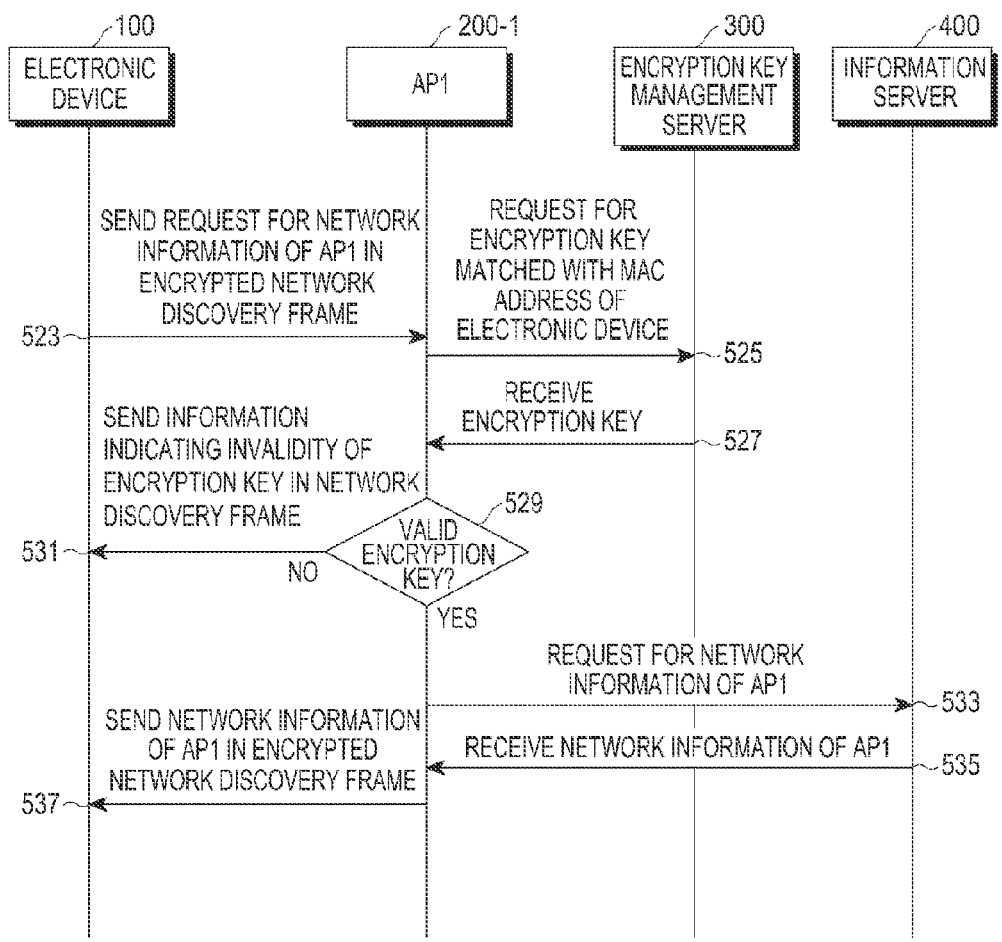

FIGS. 5A and 5B are flow diagrams illustrating a network discovery operation in an electronic device according to a first embodiment of the present invention.

Referring to FIGS. 5A and 5B, in step 501, a first AP 200-1 broadcasts a beacon frame including identification (ID) information of an information server and information indicating support of encrypted network discovery.

In step 503, the electronic device 100 discovers nearby APs through a scanning operation for a Wi-Fi connection, select the first AP 200-1 from among the discovered nearby APs (i.e., at least one of the APs 200), and sends a probe request frame to the first AP 200-1.

In step 505, the first AP 200-1 sends a probe response frame including identification (ID) information of an information server and information indicating support of encrypted network discovery, to the electronic device 100 that has sent the probe request frame.

Upon receiving the probe response frame from the first AP 200-1, the electronic device 100 determines whether the information indicating support of encrypted network discovery is present in the beacon frame or the probe response frame received from the first AP 200-1. If the information indicating support of encrypted network discovery is detected from the beacon frame or the probe response frame, the electronic device 100 detects the identification (ID) information of the information server from the beacon frame or the probe response frame.

In step 507, the electronic device 100 determines whether the detected identification (ID) information of the information server is present in the electronic device 100 (that is, whether the detected identification (ID) information of the information server is the same as identification (ID) information of an information server stored in the electronic device 100).

If it is determined in step 507 that the detected identification (ID) information of the information server is not present in the electronic device 100, the electronic device 100 sends a request for an encryption key to the first AP 200-1 in a network discovery frame in step 509, and the first AP 200-1 sends a response to the request for the encryption key in a network discovery frame in step 511. In step 513, the first AP 200-1 may add a generated encryption key to a network discovery frame and send the encryption key-added network discovery frame to the electronic device 100. Alternatively, in step 513, the first AP 200-1 may send a generated encryption key to the electronic device 100 using a method such as Wi-Fi Protected Setup (WPS) of sending multiple messages (e.g., M1 to M8) to the electronic device 100, and in this case, the first AP 200-1 recognizes the step 509 as an agreement on WPS with the electronic device 100. Further, in step 513, the first AP 200-1 may generate an expiration time of the encryption key and send the expiration time to the electronic device 100 together with the encryption key.

In step 515, the electronic device 100 matches the detected identification (ID) information of the information server with the encryption key received from the first AP 200-1, and stores the matching result in the electronic device 100. In step 521, the electronic device 100 encrypts a network discovery frame using the encryption key matched with the identification (ID) information of the information server. Further, if the generated expiration time (in step 513) of the encryption key is valid (or has not expired), the electronic device 100 may encrypt a network discovery frame using the encryption key in step 521. However, if the generated expiration time (in step 513) of the encryption key is invalid (or has expired), the electronic device 100 may receive a new encryption key from the first AP 200-1 by performing steps 509 to 513.

In step 517, the first AP 200-1 may send the MAC address of an electronic device, which is detected from the probe request frame received from the electronic device 100, and the generated encryption key, to the encryption key management server 300. The first AP 200-1 may send the generated expiration time (in step 513) to the encryption key management server 300 together with the generated encryption key.

In step 519, the encryption key management server 300 matches the MAC address of an electronic device and the encryption key (and the expiration time of the encryption key), which are received from the first AP 200-1, and store the matching result.

If it is determined in step 507 that the detected identification (ID) information of the information server is present in the electronic device 100, the electronic device 100 detects an encryption key that is stored in the electronic device corresponding to the detected identification (ID) information of the information server (that is, the stored encryption key is matched with the detected identification (ID) information of the information server), and encrypts a network discovery frame using the detected encryption key in step 521. Further, an expiration time of an encryption key may be stored together with the encryption key, and the electronic device 100 may detect the expiration time of the encryption key matched with the detected identification (ID) information of the information server. If the expiration time of the encryption key is valid (or has not expired), the electronic device 100 may encrypt a network discovery frame using the encryption key in step 521. However, if the expiration time of the encryption key is invalid (or has expired), the electronic device 100 may receive a new encryption key from the first AP 200-1 by performing steps 509 to 513.

That is, in step 521, the electronic device 100 encrypts a network discovery frame including information for requesting network information of the first AP 200-1, using the encryption key that is matched with the identification (ID) information of the information server. Here, the encryption key is stored and detected in the electronic device, or is received from the first AP 200-1.

In step 523, the electronic device 100 sends a request for network information of the first AP 200-1 to the first AP 200-1 in the encrypted network discovery frame.

In step 525, the first AP 200-1 sends, to the encryption key management server 300, a request for an encryption key matched with the MAC address of the electronic device, which is detected from the probe request frame received from the electronic device 100.

In step 527, upon receiving the request in step 525, the encryption key management server 300 sends the encryption key that is matched with the MAC address of the electronic device in step 519. Further, in step 527, the encryption key management server 300 may send the information indicating that a validity period of the encryption key matched to the MAC address of the electronic device has expired to the first AP 200-1, together with the encryption key matched to the MAC address of the electronic device.

Upon receiving an encryption key matched with the MAC address of the electronic device from the encryption key management server 300 in step 527, the first AP 200-1 attempts to decrypt the encrypted network discovery frame including information of requesting for network information of the first AP 200-1 received from the electronic device 100, using the encryption key matched with the MAC address of the electronic device.

If the first AP 200-1 fails in decrypting the encrypted network discovery frame, the first AP 200-1 determines in step 529 that the encryption key matched with the MAC address of the electronic device is an invalid encryption key, and sends information (e.g., a state code indicating 'fail') indicating that the encryption key matched with the MAC address of the electronic device is an invalid encryption key, to the electronic device 100 in a network discovery frame in step 531.

Upon receiving the information indicating that a validity period of the encryption key matched with the MAC address of the electronic device has expired from the encryption key management server 300 in step 527, the first AP 200-1 determines in step 529 that the encryption key matched with the MAC address of the electronic device is an invalid encryption key, and sends information (e.g., a state code indicating 'fail') indicating that the encryption key matched with the MAC address of the electronic device is an invalid encryption key, to the electronic device 100 in a network discovery frame in step 531.

Upon receiving the information indicating invalidity of the encryption key of the electronic device from the first AP 200-1, the electronic device 100 may receive a new encryption key from the first AP 200-1 through steps 509 to 513.

If the first AP 200-1 succeeds in decrypting the encrypted network discovery frame, the first AP 200-1 determines in step 529 that the encryption key matched with the MAC address of the electronic device is a valid encryption key. In this case, the first AP 200-1 sends a request for network information of the first AP 200-1 to the information server 400 in step 533, and receives the network information of the first AP 200-1 from the information server 400 in step 535. In step 537, the first AP 200-1 sends the network information of the first AP 200-1, which is received from the information server 400, to the electronic device 100 in the encrypted network discovery frame.

Figure 6A:
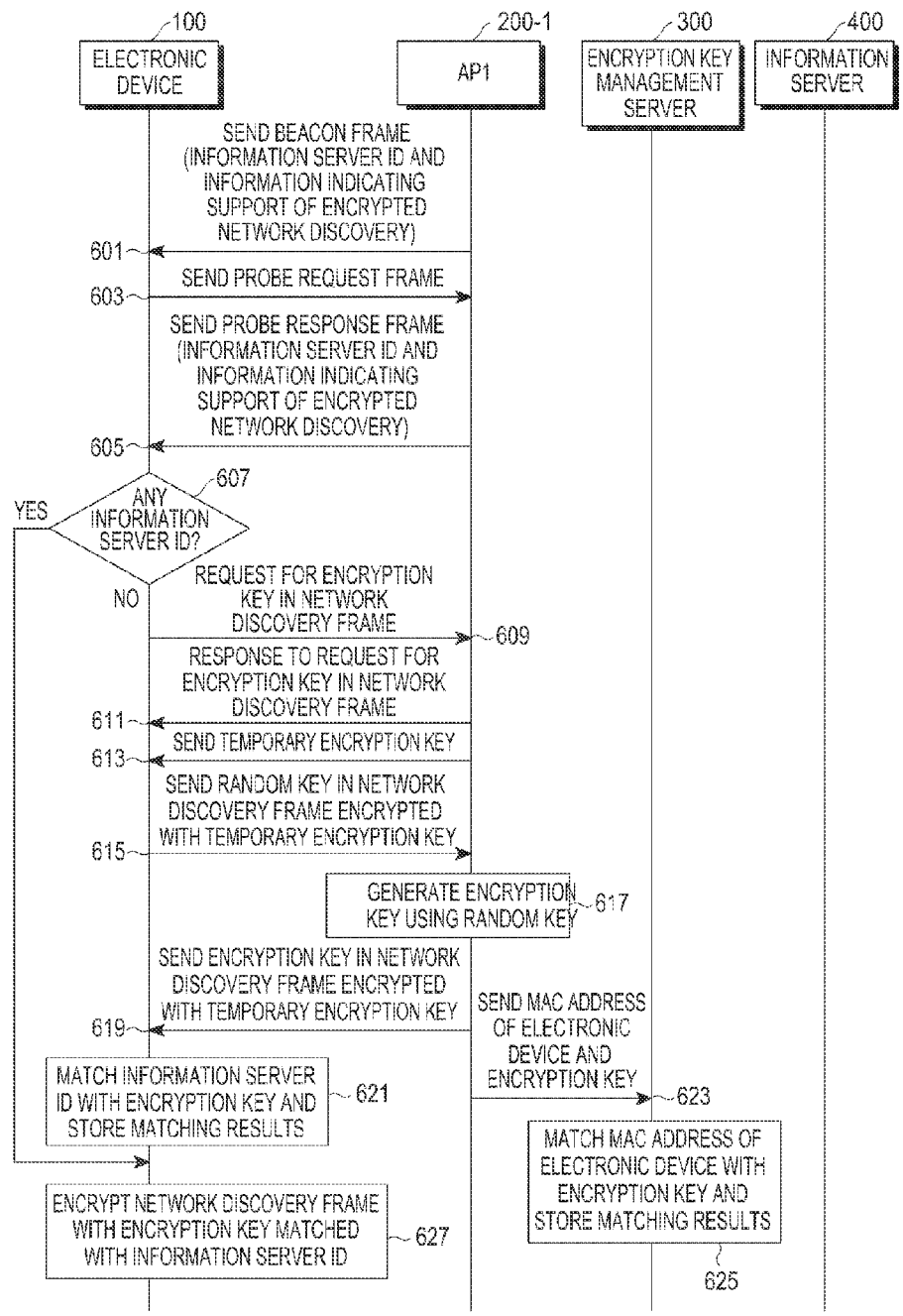
FIGS. 6A and 6B are flow diagrams illustrating a network discovery operation in an electronic device according to a second embodiment of the present invention.
Figure 6B:
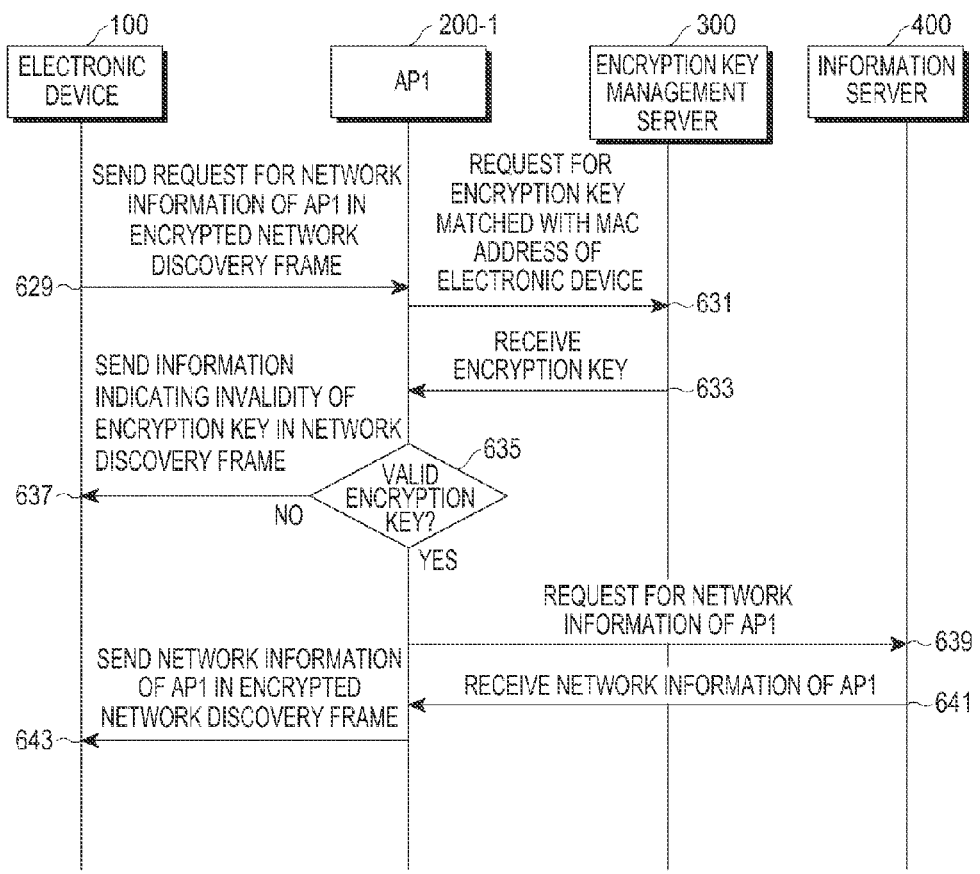

FIGS. 6A and 6B are flow diagrams illustrating a network discovery operation in an electronic device according to a second embodiment of the present invention.

Referring to FIGS. 6A and 6B, in step 601, a first AP 200-1 broadcasts a beacon frame including identification (ID) information of an information server and information indicating support of encrypted network discovery.

In step 603, the electronic device 100 discovers nearby APs through a scanning operation for a Wi-Fi connection, select the first AP 200-1 from among the discovered nearby APs (i.e., at least one of the APs 200), and sends a probe request frame to the first AP 200-1.

In step 605, the first AP 200-1 sends a probe response frame including identification (ID) information of an information server and information indicating support of encrypted network discovery, to the electronic device 100 that has sent the probe request frame.

Upon receiving the probe response frame from the first AP 200-1, the electronic device 100 determines whether the information indicating support of encrypted network discovery is present in the beacon frame or the probe response frame received from the first AP 200-1. If the information indicating support of encrypted network discovery is detected from the beacon frame or the probe response frame, the electronic device 100 detects identification (ID) information of the information server from the beacon frame or the probe response frame.

In step 607, the electronic device 100 determines whether the detected identification information ID of an information server is present in the electronic device 100 (that is, whether the detected identification (ID) information of the information server is the same as identification (ID) information of an information server stored in the electronic device 100).

If it is determined in step 607 that the detected identification (ID) information of the information server is not present in the electronic device 100, the electronic device 100 sends a request for an encryption key to the first AP 200-1 in a network discovery frame in step 609, and the first AP 200-1 sends a response to the request for the encryption key in a network discovery frame in step 611. In step 613, the first AP 200-1 generates a temporary encryption key and sends the temporary encryption key to the electronic device 100. In step 615, the electronic device 100 randomly generates a nonce value as a random key, adds the random key to a network discovery frame, encrypts the random key-added network discovery frame with the temporary encryption key, and sends the encrypted random key-added network discovery frame to the first AP 200-1. In step 617, the first AP 200-1 detects the random key by decrypting the encrypted random key-added network discovery frame using the temporary encryption key, and generates an encryption key using the detected random key. In step 617, the first AP 200-1 may generate an encryption key by combining the detected random key (or nonce value) received from the electronic device 100, the temporary random key (or nonce value) generated in the first AP 200-1, a MAC address of an electronic device detected from the probe request frame received from the electronic device 100, an encryption key generation time, and the like. In step 619, the first AP 200-1 adds the encryption key to a network discovery frame, encrypts the encryption key-added network discovery frame with the temporary encryption key, and sends the encrypted encryption key-added network discovery frame to the electronic device 100. Further, in step 619, the first AP 200-1 may generate an expiration time of the encryption key and send the expiration time to the electronic device 100 together with the encryption key.

In step 621, the electronic device 100 matches the detected identification (ID) information of an information server with the encryption key received from the first AP 200-1, and stores the matching result in the electronic device 100. In step 627, the electronic device 100 encrypts a network discovery frame using the encryption key matched with the identification (ID) information of the information server.

In step 623, the first AP 200-1 sends the MAC address of an electronic device, which is detected from the probe request frame received from the electronic device 100, and the generated encryption key, to the encryption key management server 300. The first AP 200-1 may send the generated expiration time (in step 627) to the encryption key management server 300 together with the generated encryption key.

In step 625, the encryption key management server 300 matches the MAC address of an electronic device and the encryption key (and the expiration time of the encryption key), which are received from the first AP 200-1, and store the matching result.

If it is determined in step 607 that the detected identification (ID) information of an information server is present in the electronic device 100, the electronic device 100 detects an encryption key that is stored in the electronic device corresponding to the detected identification ID of an information server (that is, the stored encryption key is matched with the detected identification (ID) information of the information server), and encrypts a network discovery frame using the detected encryption key in step 627. Further, an expiration time of an encryption key may be stored together with the encryption key, and the electronic device 100 may detect the expiration time of the encryption key matched with the detected identification (ID) information of the information server. If the expiration time of the encryption key is valid (or has not expired), the electronic device 100 may encrypt a network discovery frame using the encryption key in step 627. However, if the expiration time of the encryption key is invalid (or has expired), the electronic device 100 may receive a new encryption key from the first AP 200-1 by performing steps 609 to 619. That is, in step 627, the electronic device 100 encrypts a network discovery frame including information for requesting network information of the first AP 200-1, using the encryption key that is matched with the identification (ID) information of the information server. Here, the encryption key is stored and detected in the electronic device, or is received from the first AP 200-1.

In step 629, the electronic device 100 sends a request for network information of the first AP 200-1 to the first AP 200-1 in the encrypted network discovery frame.

In step 631, the first AP 200-1 sends, to the encryption key management server 300, a request for an encryption key matched with the MAC address of the electronic device, which is detected from the probe request frame received from the electronic device 100.

In step 633, upon receiving the request in step 631, the encryption key management server 300 sends the encryption key that is matched with the MAC address of the electronic device in step 625. Further, in step 633, the encryption key management server 300 may send the information indicating that a validity period of the encryption key matched to the MAC address of the electronic device has expired to the first AP 200-1, together with the encryption key matched to the MAC address of the electronic device.

Upon receiving an encryption key matched with the MAC address of the electronic device from the encryption key management server 300 in step 633, the first AP 200-1 attempts to decrypt the encrypted network discovery frame including information of requesting for network information of the first AP 200-1 received from the electronic device 100, using the encryption key matched with the MAC address of the electronic device.

If the first AP 200-1 fails in decrypting the encrypted network discovery frame, the first AP 200-1 determines in step 635 that the encryption key matched with the MAC address of the electronic device is an invalid encryption key, and sends information (e.g., a state code indicating 'fail') indicating that the encryption key matched with the MAC address of the electronic device is an invalid encryption key, to the electronic device 100 in a network discovery frame in step 637.

Upon receiving the information indicating that a validity period of the encryption key matched with the MAC address of the electronic device has expired from the encryption key management server 300 in step 633, the first AP 200-1 determines in step 635 that the encryption key matched with the MAC address of the electronic device is an invalid encryption key, and sends information (e.g., a state code indicating 'fail') indicating that the encryption key matched with the MAC address of the electronic device is an invalid encryption key, to the electronic device 100 in a network discovery frame in step 637.

Upon receiving the information indicating invalidity of the encryption key of the electronic device from the first AP 200-1, the electronic device 100 may receive a new encryption key from the first AP 200-1 through steps 609 to 619.

If the first AP 200-1 succeeds in decrypting the encrypted network discovery frame, the first AP 200-1 determines in step 635 that the encryption key matched with the MAC address of the electronic device is a valid encryption key. In this case, the first AP 200-1 sends a request for network information of the first AP 200-1 to the information server 400 in step 639, and receives the network information of the first AP 200-1 from the information server 400 in step 641. In step 643, the first AP 200-1 sends the network information of the first AP 200-1, which is received from the information server 400, to the electronic device 100.

Figure 7A:
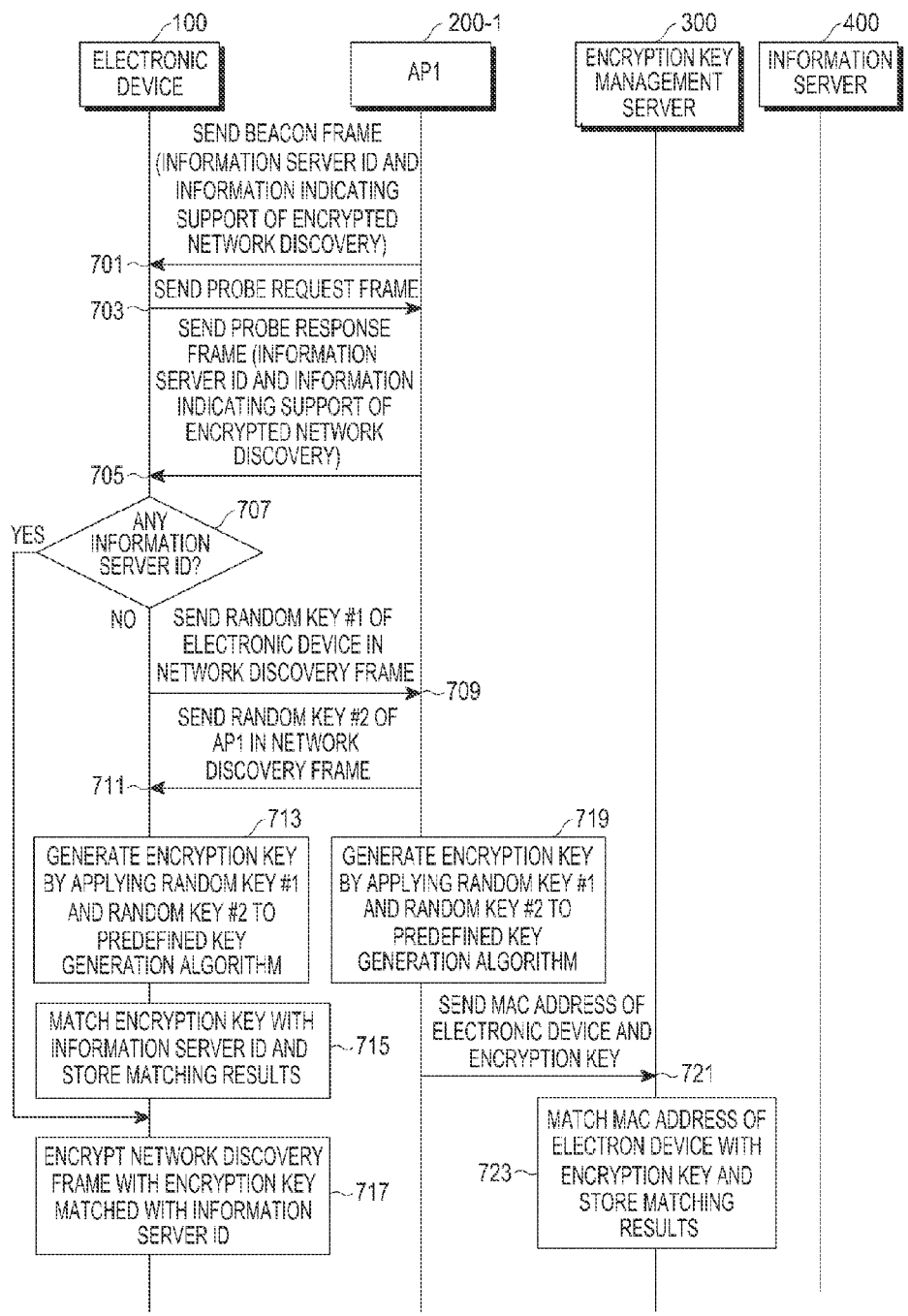
FIGS. 7A and 7B are flow diagrams illustrating a network discovery operation in an electronic device according to a third embodiment of the present invention.
Figure 7B:
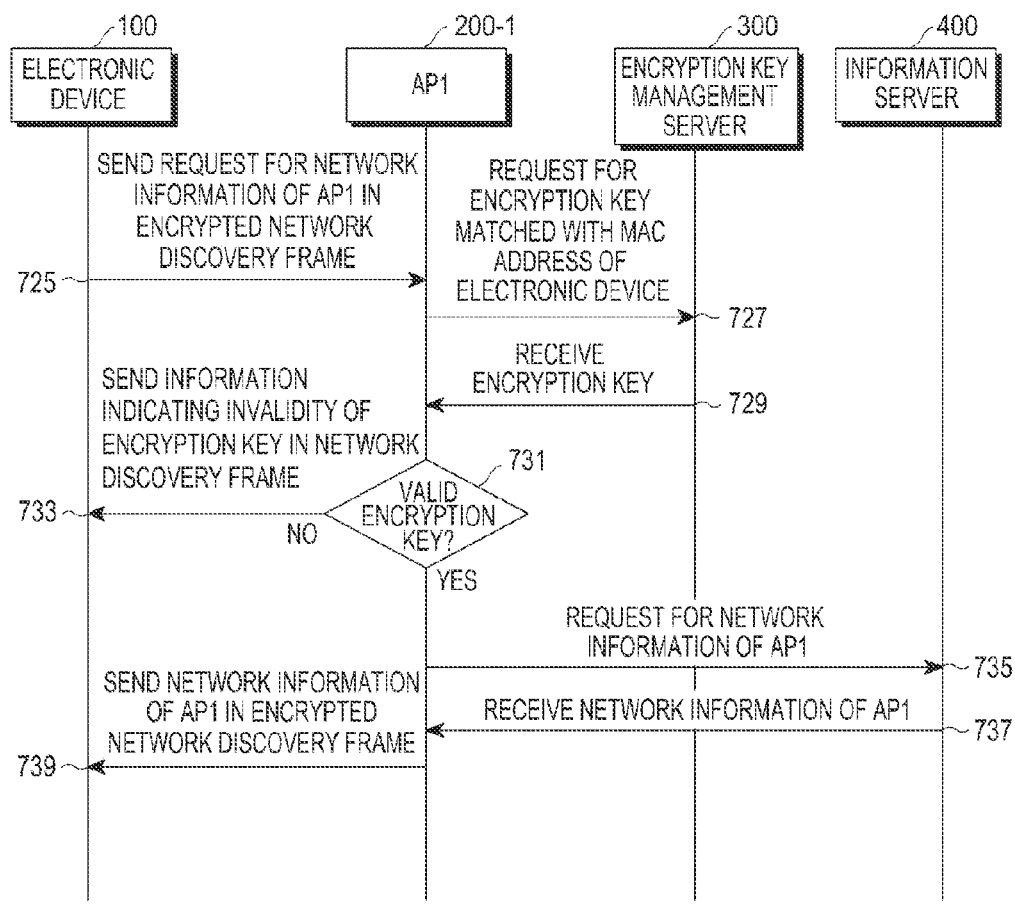

FIGS. 7A and 7B are flow diagrams illustrating a network discovery operation in an electronic device according to a third embodiment of the present invention.

Referring to FIGS. 7A and 7B, in step 701, a first AP 200-1 broadcasts a beacon frame including identification (ID) information of an information server and information indicating support of encrypted network discovery.

In step 703, the electronic device 100 discovers nearby APs through a scanning operation for a Wi-Fi connection, selects the first AP 200-1 from among the discovered nearby APs (i.e., at least one of the APs 200), and sends a probe request frame to the first AP 200-1.

In step 705, the first AP 200-1 sends a probe response frame including identification (ID) information of an information server and information indicating support of encrypted network discovery, to the electronic device 100 that has sent the probe request frame.

Upon receiving the probe response frame from the first AP 200-1, the electronic device 100 determines whether the information indicating support of encrypted network discovery is present in the beacon frame or the probe response frame received from the first AP 200-1. If the information indicating support of encrypted network discovery is detected from the beacon frame or the probe response frame, the electronic device 100 detects the identification (ID) information of the information server from the beacon frame or the probe response frame.

In step 707, the electronic device 100 determines whether the detected identification (ID) information of an information server is present in the electronic device 100 (that is, whether the detected identification (ID) information of the information server is the same as identification (ID) information of an information server stored in the electronic device 100).

If it is determined in step 707 that the detected identification (ID) information of the information server is not present in the electronic device 100, the electronic device 100 generates a first random key, adds the first random key to a network discover frame, and sends the first random key-added network discover frame to the first AP 200-1 in step 709. In step 711, upon receiving the first random key from the electronic device 100, the first AP 200-1 generates a second random key, adds the second random key to a network discovery frame, and sends the second random key-added network discovery frame to the electronic device 100.

In step 713, the electronic device 100 generates an encryption key by applying the first random key and the second random key to a key generation algorithm predefined between the electronic device 100 and the first AP 200-1. Further, in step 713, the electronic device 100 may generate an expiration time of the encryption key, and store the generated expiration time together with the encryption key.

In step 715, the electronic device 100 matches the generated encryption key with the detected identification (ID) information of the information server, and stores the matching result in the electronic device 100. In step 717, the electronic device 100 encrypts a network discovery frame using the encryption key matched with the identification (ID) information of the information server. Further, if the generated expiration time (in step 713) of the encryption key is valid (or has not expired), the electronic device 100 may encrypt a network discovery frame using the encryption key in step 521. However, if the generated expiration time (in step 713) of the encryption key is invalid (or has expired), the electronic device 100 may receive a new encryption key from the first AP 200-1 by performing steps 709 to 713.

In step 719, the first AP 200-1 generates the same encryption key as the encryption key generated by the electronic device 100 in step 713, by applying the first random key and the second random key to the key generation algorithm predefined between the electronic device 100 and the first AP 200-1. Further, in step 719, the first AP 200-1 may generate the same expiration time of the encryption key as the expiration time of the encryption key generated by the electronic device 100 in step 713.

In step 721, the first AP 200-1 may send the MAC address of an electronic device, which is detected from the probe request frame received from the electronic device 100, and the generated encryption key (in step 713 or step 719), to the encryption key management server 300. The first AP 200-1 may send the generated expiration time (in step 713 or step 719) to the encryption key management server 300 together with the generated encryption key.

In step 723, the encryption key management server 300 matches the MAC address of an electronic device and the encryption key (and the expiration time of the encryption key), which are received from the first AP 200-1, and store the matching result.

If it is determined in step 707 that the detected identification (ID) information of the information server is present in the electronic device 100, the electronic device 100 detects an encryption key that is stored in the electronic device corresponding to the detected identification ID of an information server (that is, the stored encryption key is matched with the detected identification (ID) information of the information server), and encrypts a network discovery frame using the detected encryption key in step 717. Further, an expiration time of an encryption key may be stored together with the encryption key, and the electronic device 100 may detect the expiration time of the encryption key matched with the detected identification (ID) information of the information server. If the expiration time of the encryption key is valid (or has not expired), the electronic device 100 may encrypt a network discovery frame using the encryption key in step 717. However, if the expiration time of the encryption key is invalid (or has expired), the electronic device 100 may receive a new encryption key from the first AP 200-1 by performing steps 709 to 713.

That is, in step 717, the electronic device 100 encrypts a network discovery frame including information for requesting network information of the first AP 200-1, using the encryption key that is matched with the identification (ID) information of the information server. Here, the encryption key is stored and detected in the electronic device, or is received from the first AP 200-1.

In step 725, the electronic device 100 sends a request for network information of the first AP 200-1 to the first AP 200-1 in the encrypted network discovery frame.

In step 727, the first AP 200-1 sends, to the encryption key management server 300, a request for an encryption key matched with the MAC address of the electronic device, which is detected from the probe request frame received from the electronic device 100.

In step 729, upon receiving the request in step 727, the encryption key management server 300 sends the encryption key that is matched with the MAC address of the electronic device in step 723. Further, in step 729, the encryption key management server 300 may send the information indicating that a validity period of the encryption key matched to the MAC address of the electronic device has expired to the first AP 200-1, together with the encryption key matched to the MAC address of the electronic device.

Upon receiving an encryption key matched with the MAC address of the electronic device from the encryption key management server 300 in step 729, the first AP 200-1 attempts to decrypt the encrypted network discovery frame including information of requesting for network information of the first AP 200-1 received from the electronic device 100, using the encryption key matched with the MAC address of the electronic device.

If the first AP 200-1 fails in decrypting the encrypted network discovery frame, the first AP 200-1 determines in step 731 that the encryption key matched with the MAC address of the electronic device is an invalid encryption key, and sends information (e.g., a state code indicating 'fail') indicating that the encryption key matched with the MAC address of the electronic device is an invalid encryption key, to the electronic device 100 in a network discovery frame in step 733.

Upon receiving the information indicating that a validity period of the encryption key matched with the MAC address of the electronic device has expired from the encryption key management server 300 in step 729, the first AP 200-1 determines in step 731 that the encryption key matched with the MAC address of the electronic device is an invalid encryption key, and sends information (e.g., a state code indicating 'fail') indicating that the encryption key matched with the MAC address of the electronic device is an invalid encryption key, to the electronic device 100 in a network discovery frame in step 733.

Upon receiving the information indicating invalidity of the encryption key of the electronic device from the first AP 200-1, the electronic device 100 may receive a new encryption key from the first AP 200-1 through steps 709 to 713.

If the first AP 200-1 succeeds in decrypting the encrypted network discovery frame, the first AP 200-1 determines in step 731 that the encryption key matched with the MAC address of the electronic device is a valid encryption key. In this case, the first AP 200-1 sends a request for network information of the first AP 200-1 to the information server 400 in step 735, and receives the network information of the first AP 200-1 from the information server 400 in step 737. In step 739, the first AP 200-1 sends the network information of the first AP 200-1, which is received from the information server 400, to the electronic device 100.

Figure 8:
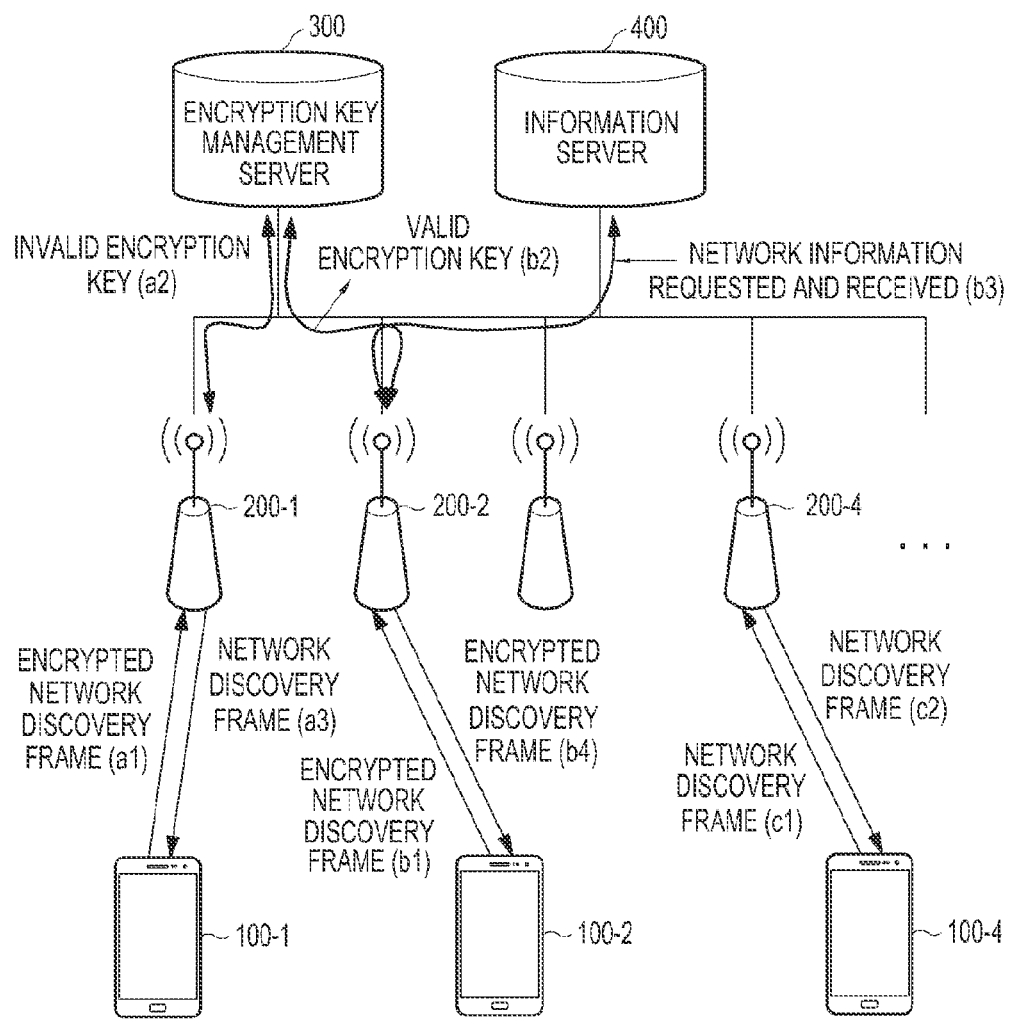
FIGS. 8 and 9 illustrate network discovery operations in an electronic device according to an embodiment of the present invention.
Figure 9:
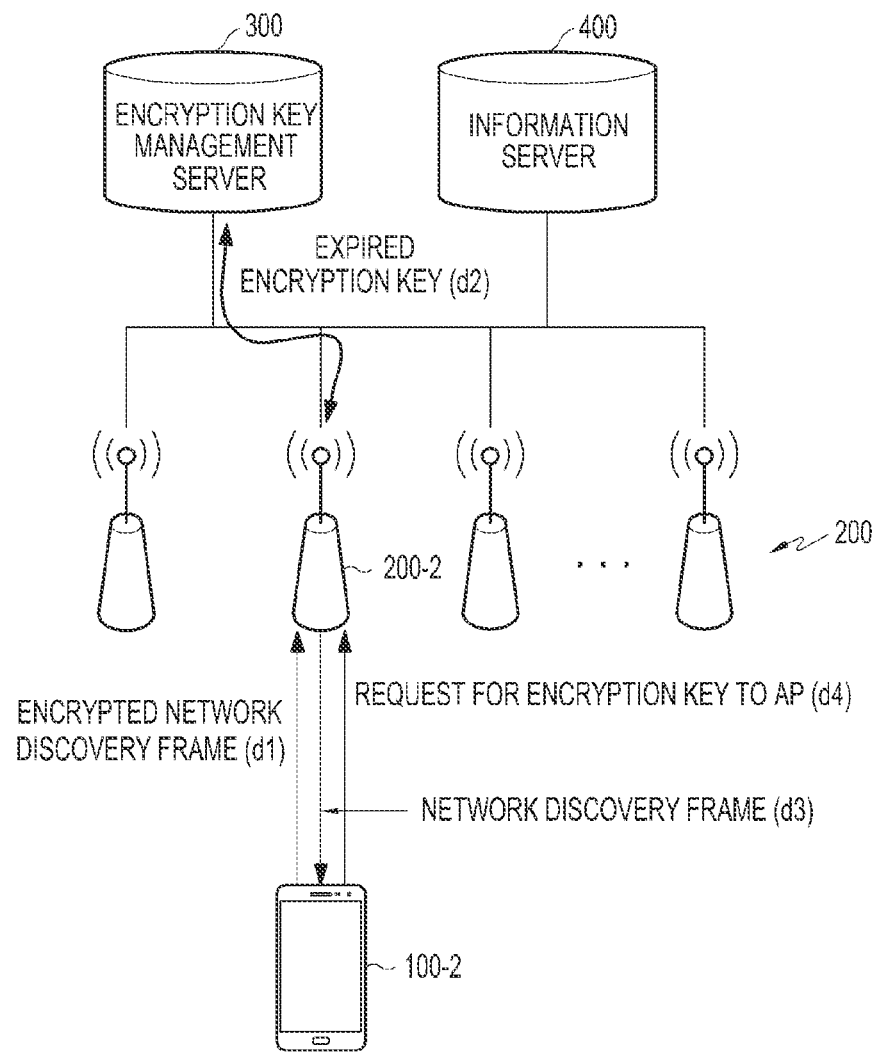

FIGS. 8 and 9 illustrate network discovery operations in an electronic device according to an embodiment of the present invention. The network discovery operations in FIGS. 8 and 9 may correspond to the examples of providing network information depending on the validity of an encryption key in the operations of FIGS. 5 to 7. In the Wi-Fi Hotspot network system illustrated in FIGS. 8 and 9, the information server 400 may be connected to multiple APs 200, and provide network information of each AP. The encryption key management server 300 may match a MAC address of an electronic device and an encryption key (and an expiration time of the encryption key), which are transmitted from each of the multiple APs, and store the matching results. The multiple APs 200 each may receive an encryption key that is matched to a MAC address of an electronic device. In FIGS. 8 and 9, the first to fourth electronic devices may include the same components as those of the electronic device illustrated in FIG. 3.

In the Wi-Fi Hotspot network system illustrated in FIG. 8, a first electronic device 100-1 encrypts a network discovery frame including information for requesting network information of the first AP 200-1, and sends the encrypted network discovery frame to the first AP 200-1 (a1). Upon receiving the encrypted network discovery frame from the first electronic device 100-1, the first AP 200-1 sends a request for an encryption key corresponding to a MAC address of the first electronic device to the encryption key management server 300, and receives an encryption key corresponding to the MAC address of the first electronic device from the encryption key management server 300 (a2). However, if the first AP 200-1 fails in decrypting the encrypted network discovery frame using the encryption key corresponding to the MAC address of the first electronic device, the first AP 200-1 sends a network discovery frame, to which information (e.g., a state code) indicating invalidity of the encryption key of the first electronic device 100-1 is added, to the first electronic device 100-1 (a3).

In the Wi-Fi Hotspot network system illustrated in FIG. 8, a second electronic device 100-2 encrypts a network discovery frame including information for requesting network information of a second AP 200-2 and sends the encrypted network discovery frame to the second AP 200-2 (b1). Upon receiving the encrypted network discovery frame from the second electronic device 100-2, the second AP 200-2 sends a request for an encryption key corresponding to a MAC address of the second electronic device to the encryption key management server 300, and receives an encryption key corresponding to the MAC address of the second electronic device from the encryption key management server 300 (b2). If the second AP 200-2 succeeds in decrypting the encrypted network discovery frame using the encryption key corresponding to the MAC address of the first electronic device, the second AP 200-2 sends a request for network information of the second AP 200-2 to the information server 400, and receives the network information of the second AP 200-2 from the information server 400 (b3). The second AP 200-2 adds the network information of the second AP, which is received from the information server 400, to a network discovery frame, and sends the network discovery frame, which is encrypted using the encryption key received from the encryption key management server 300, to the second electronic device 100-2 (b4).

In the Wi-Fi Hotspot network system illustrated in FIG. 8, if a fourth electronic device 100-4 sends a non-encrypted network discovery frame that is a beacon frame or probe response frame including information indicating support of encrypted network support, to a fourth AP 200-4 (c1), the fourth AP 200-4 sends a network discovery frame, to which information (e.g., a state code) indicating the absence of an encryption key in the fourth electronic device 100-4 is added, to the fourth electronic device 100-4 (c2).

In the Wi-Fi Hotspot network system illustrated in FIG. 9, the second electronic device 100-2 encrypts a network discovery frame including information for requesting network information of the second AP 200-2, and sends the encrypted network discovery frame to the second electronic device 100-2 (d1). Upon receiving the encrypted network discovery frame from the second electronic device 100-2, the second AP 200-2 sends a request for an encryption key corresponding to a MAC address of the second electronic device to the encryption key management server 300, and if a validity period of the encryption key corresponding to the MAC address of the second electronic device has expired, the encryption key management server 300 sends information indicating the expiration of the validity period of the encryption key to the second AP 200-2 (d2). Upon receiving the information indicating the expiration of the validity period of the encryption key from the encryption key management server 300, the second AP 200-2 sends a network discovery frame, to which information indicating the expiration of the validity period of the encryption key of the second electronic device is added, to the second electronic device 100-2 (d3). Upon receiving the network discovery frame, to which information indicating the expiration of the validity period of the encryption key of the second electronic device is added, from the second AP 200-2, the second electronic device 100-2 sends a request for a new encryption key to the second AP 200-2 (d4).

A network discovery method in an electronic device according to various embodiments of the present invention may be implemented as a computer-readable code in a non-transitory computer-readable recording medium. The computer-readable recording medium may include all types of recording devices storing the data that can be read by the computer system. Examples of the recording medium may include Read Only Memory (ROM), Random Access Memory (RAM), optical disk, magnetic tape, floppy disk, hard disk, non-volatile memory and the like, and may also include a medium that is implemented in the form of carrier waves (e.g., transmission over the Internet). The computer-readable recording medium may be distributed over the computer systems connected over the network, and the computer-readable code may be stored and executed in the computer-readable recording medium in a distributed manner.

As is apparent from the foregoing description, an aspect of various embodiments of the present invention is to provide an electronic device capable of securely requesting and receiving network information of an external device in a network discovery operation that is performed before the electronic device is connected to the external device, and a method for discovering a network in the electronic device.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An electronic device comprising:
   a memory configured to store identification information of an information server that is matched with an encryption key; and
   a controller configured to:
   send, before the electronic device is connected with an external device, a request for network information of the external device to the information server through the external device connected to the information server in a network discovery frame encrypted using the encryption key matched with the identification information of the information server;
   receive the network information of the external device from the information server through the external device connected to the information server in the encrypted network discovery frame;
   discover at least one external device through a scanning operation;
   select the external device from the discovered at least one external device;
   upon detecting information indicating support of encrypted network discovery from a beacon frame or a probe response frame received from the external device, detect the identification information of the information server from the beacon frame or the probe response frame, and determine whether the detected identification information of the information server is present in the memory; and
   if it is determined that the detected identification information of the information server is present in the memory, detect the encryption key that is stored in the memory, and encrypt the network discovery frame using the encryption key matched with the identification information of the information server.

2. The electronic device of claim 1, wherein the external device includes an Access Point (AP) supporting Hotspot 2.0.

3. The electronic device of claim 1, wherein the beacon frame or the probe response frame includes the identification information of the information server and the information indicating support of encrypted network discovery, wherein the information server is connected to the external device and provides the network information of the external device.

4. The electronic device of claim 1, wherein if it is determined that the detected identification information of the information server is not present in the memory, the controller is further configured to send a request for the encryption key to the external device, to, upon receiving the encryption key from the external device, match the encryption key with the identification information of an information server, to store a matching result in the memory, and to encrypt the network discovery frame using the encryption key matched with the identification information of the information server.

5. The electronic device of claim 1, wherein if it is determined that the detected identification information of the information server is not present in the memory, the controller is further configured to send a request for the encryption key to the external device, to, upon receiving a temporary encryption key from the external device, send a random key to the external device in a network discovery frame encrypted with the temporary encryption key, and to, upon receiving the encryption key from the external device in the network discovery frame encrypted with the temporary encryption key, match the encryption key with the identification information of the information server, to store a matching result in the memory, and to encrypt the network discovery frame using the encryption key matched with the identification information of the information server.

6. The electronic device of claim 1, wherein if it is determined that the detected identification information of the information server is not present in the memory, the controller is further configured to generate the encryption key by applying a first random key generated in the electronic device and a second random key received from the external device to a predefined key generation algorithm, to match the encryption key with the identification information of the information server, to store a matching result in the memory, and to encrypt the network discovery frame using the encryption key matched with the identification information of the information server.

7. The electronic device of claim 6, the controller is further configured to send the first random key to the external device.

8. The electronic device of claim 1, wherein the controller is further configured to send a request for a new encryption key to the external device, upon receiving information indicating encryption key invalidity from the external device in a network discovery frame.

9. The electronic device of claim 8, wherein the information indicating encryption key invalidity includes information indicating a mismatch between an encryption key of the electronic device and the encryption key matched with the identification information of the information server, or information indicating expiration of a valid period of the encryption key of the electronic device.

10. A method for discovering a network in an electronic device, the method comprising:
encrypting a network discovery frame using an encryption key, before the electronic device is connected with an external device;
sending a request for network information of the external device to the information server through the external device connected to the information server in the encrypted network discovery frame; and
receiving the network information of the external device from the information server through the external device connected to the information server in the encrypted network discovery frame, wherein encrypting the network discovery frame comprises:
discovering at least one external device through a scanning operation;
selecting the external device from the discovered at least one external device;
determining whether information indicatinq support of encrypted network discovery is present in a beacon frame or a probe response frame received from the selected external device;
detecting the information indicatinq support of encrypted network discovery from the beacon frame or the probe response frame;
detecting identification information of an information server from the beacon frame or the probe response frame, upon detecting the information indicating support of encrypted network discovery from the beacon frame or the probe response frame;
determining whether the detected identification information of the information server is present in a memory of the electronic device;
if it is determined that the detected identification information of the information server is present in the memory, detecting an encryption key that is stored in the memory and matched with the identification information of the information server; and
encrypting the network discovery frame using the encryption key matched with the identification information of the information server.

11. The method of claim 10, wherein the external device includes an Access Point (AP) supporting Hotspot 2.0.

12. The method of claim 10, wherein the beacon frame or the probe response frame includes the identification information of the information server and the information indicating support of encrypted network discovery, and
wherein the information server is connected to the external device and provides the network information of the external device.

13. The method of claim 10, further comprising:
if it is determined that the detected identification information of the information server is not present in the memory, sending a request for the encryption key to the external device;
upon receiving the encryption key from the external device, matching the encryption key with the identification information of the information server, storing a matching result in the memory; and
encrypting the network discovery frame using the encryption key matched with the identification information of the information server.

14. The method of claim 10, further comprising:
if it is determined that the detected identification information of an information server is not present in the memory, sending a request for the encryption key to the external device;
upon receiving a temporary encryption key from the external device, sending a random key to the external device in a network discovery frame encrypted with the temporary encryption key;
upon receiving the encryption key from the external device in a network discovery frame encrypted with the temporary encryption key, matching the encryption key with the identification information of the information server and storing a matching result in the memory; and encrypting the network discovery frame using the encryption key matched with the identification information of the information server.

15. The method of claim 10, further comprising:

if it is determined that the detected identification information of the information server is not present in the memory, generating the encryption key by applying a first random key of the electronic device and a second random key received from the external device to a predefined key generation algorithm;

matching the encryption key with the identification information of the information server, and storing a matching result in the memory; and encrypting the network discovery frame using the encryption key matched with the identification information of the information server.

16. The method of claim 15, further comprising sending the first random key to the external device.

17. The method of claim 10, further comprising:

sending a request for a new encryption key to the external device, upon receiving information indicating encryption key invalidity from the external device in a network discovery frame.

18. The method of claim 17, wherein the information indicating encryption key invalidity includes information indicating a mismatch between an encryption key of the electronic device and the encryption key matched with the identification information of the information server, or information indicating expiration of a valid period of the encryption key of the electronic device.

* * * * *